United States Patent
Shimomukai

[11] Patent Number: 6,011,949
[45] Date of Patent: Jan. 4, 2000

[54] STUDY SUPPORT SYSTEM

[76] Inventor: Satoru Shimomukai, 3-5-501, Sonenishimachi 2-chome, Toyonaka-shi, Osaka-fu, Japan

[21] Appl. No.: 08/886,450

[22] Filed: Jul. 1, 1997

[51] Int. Cl.[7] ..................................................... G09B 7/00
[52] U.S. Cl. ......................... 434/358; 434/308; 434/169; 434/315
[58] Field of Search .................................... 434/308, 169, 434/322, 307 R, 317, 358, 315

[56] References Cited

U.S. PATENT DOCUMENTS

| | | | |
|---|---|---|---|
| 4,189,852 | 2/1980 | Chatlien | 43/178 |
| 4,308,017 | 12/1981 | Laughton et al. | 434/169 |
| 4,406,626 | 9/1983 | Anderson et al. | 704/270 |
| 4,505,682 | 3/1985 | Thompson | 434/335 |
| 4,549,867 | 10/1985 | Dittakavi | 434/337 |
| 4,602,152 | 7/1986 | Dittakavi | 235/463 |
| 4,809,246 | 2/1989 | Jeng | 434/317 |
| 4,994,987 | 2/1991 | Baldwin | 434/305 |
| 5,059,126 | 10/1991 | Kimball | 434/308 |
| 5,477,510 | 12/1995 | Ukita | 369/18 |
| 5,575,659 | 11/1996 | King et al. | 434/167 |
| 5,739,814 | 4/1998 | Ohara et al. | 345/173 |
| 5,873,735 | 2/1999 | Yamada et al. | 434/316 |
| 5,899,700 | 5/1999 | Williams et al. | 434/308 |

*Primary Examiner*—Jessica J. Harrison
*Assistant Examiner*—David A Fleming
*Attorney, Agent, or Firm*—Birch, Stewart, Kolasch & Birch, LLP

[57] ABSTRACT

A study support system comprises computer means and a text in which the subject for study, a problem and a bar code representing the problem are printed; the computer means including a bar code reader, output means, processing means, and storage means in which the answer to the problem, an explanation thereof, and a similar exercise are stored, whereby, when the bar code is read by the bar code reader, the processing means reads out from the storage means the data such as the answer, explanation and the like relating to the data read by the bar code reader, and the data are output by the output means as sight information displayed on a screen and/or printed on paper and/or as aural information.

8 Claims, 7 Drawing Sheets

PARALLEL & CONGRUENCE <<MATHEMATICS, BASIS>> DATE:

[POINT] [W2-05-01-01(1)]

★ VERTICAL ANGLES
◇ TWO OPPOSITE CORNERS SUCH AS ∠a & ∠c,
∠b & ∠d AMONG THE FOUR CORNERS
FORMED WITH TWO INTERSECTING STRAIGHT LINES
ARE CALLED <u>VERTICAL ANGLES.</u>
◇ CHARACTER OF VERTICAL ANGLES
VERTICAL ANGLES ARE EQUAL TO EACH OTHER.
∠a = ∠c, ∠b = ∠d

[EXERCISE] [W2-05-01-02(2)]
FIND THE ANGLE OF THE FOLLOWING CORNERS WHEN THREE STRAIGHT LINES ON A PLANE INTERSECT AT A POINT AND THE ANGLES OF THE CORNERS ARE SHOWN RIGHT.
① ∠a   ② ∠c
③ ∠b   ④ ∠d

<EXPLANATION>
CONSIDER THAT THE VERTICAL ANGLES ARE EQUAL TO EACH OTHER.
① ∠a = ∠b, ∠b = 180° - (60° + 65°) = 55°
   ACCORDINGLY ∠a = 55°
② FROM ①, ∠b = 55°
③ ∠c = 65°
④ ∠d = 60°

<ANSWER>
① 55° ② 55° ③ 65° ④ 60°

[SIMILAR EXERCISE] [W2-05-01-03(3)]
FIND THE ANGLE OF THE FOLLOWING CORNERS WHEN THREE STRAIGHT LINES ON A PLANE INTERSECT AT A POINT AND THE ANGLES OF THE CORNERS ARE SHOWN RIGHT.
① ∠a   ② ∠c
③ ∠b   ④ ∠d

[PROBLEM 1] [W2-05-01-01(3)]
FIND THE ANGLES OF THE FOLLOWING ∠x, ∠y.
①   ②

Fig.3

MENU SHEET

A — Mathematics
- RePrint  ▮▮▮▮▮ 17
- Pattern  ▮▮▮▮▮
- Problem Feedback  ▮▮▮▮▮
- Point Feedback  ▮▮▮▮▮

B — Student Code Input    (no name case)   ▮▮▮▮▮ )

C — Input No. of similar exercises → Pttern No. Input    17

| 1 | 2 | 3 | 4 | 5 |
|---|---|---|---|---|
| ▮▮ | ▮▮ | ▮▮ | ▮▮ | ▮▮ |

D — Print ——— with problem ——— without problem
- Problem & Answer ▮▮▮   Answer only ▮▮▮ 17
- Problem, Ans. & Exp. ▮▮▮   Explanation only ▮▮▮
- Problem ▮▮▮   Answer & Explanation ▮▮▮

Display
- Answer & Explanation ▮▮▮   Answer ▮▮▮

E — Clear
- All clear ▮▮▮   Clear ▮▮▮

STUDENT BAR CODE LIST

Grade [ Elementary School   1st year ]

| a1 001 | Kyoko Ishikawa | | a1 002 | Ikuko Asao | |
|---|---|---|---|---|---|
| a2 005 | Emi Hosokawa | | s1 015 | Noriko Ojima | |
| s1 020 | Yoshiko Nakata | | s1 021 | Seiko Hashimoto | |
| s1 022 | Jyunichi Ishihara | | s1 023 | Keisuke Yokoyama | |
| s1 024 | Yousuke Nomura | | s1 025 | Yuuko Nakamura | |
| s1 028 | Ishida | | a1 030 | Nobuo Harada | |
| a1 031 | Yujiro Ishihara | | a1 032 | Kimiko Date | |
| a1 033 | Syuzo Matsuoka | | a1 034 | Yuuko Matsuo | |

| Circle | (1995/7/26) | 33 | [Syuzou Matsuoka | ] |

[Problem 1]                                                   [M2-05-03-04(3)]

[Answer]

① external angle = 72°      internal angle = 108°

② external angle = 24°      internal angle = 156°

③ external angle = 15°      internal angle = 165°

[Problem 2]                                                   [M2-05-03-05(4)]

[Answer]

①     13 polygon      ②    regular decagon     ③ 12

Student Code

```
         (1995/7/26)      15   [Noriko OJIMA        ]
```

[Problem 1]                                              [M2-07-04-01(3)2]

[Explanation]

When $l \mathbin{/\mkern-3mu/} m \mathbin{/\mkern-3mu/} n$ in the right fig., $a : c = b : d = e : f.$ $x$ value can be found using this relationship.

①     $7 : x = 4 : 2.4,$    thus    $4x = 16.8,$    $x = 4.2$ ②     $5 : x = 9 : 7.2,$    thus    $9x = 36,$    $x = 4$ ③     $x : (4+6) = 3.6 : 6,$    $6x = 36,$    $x = 6$

[Answer]

①   $x = 4.2$    ②   $x = 4$    ③   $x = 6$

- - - - - - - - - - - - - - - - - - - - - - - - - - - - - - - - - - - - - - - - - -

[Problem 2]                                              [M2-07-04-01(3)1]

When $l \mathbin{/\mkern-3mu/} m \mathbin{/\mkern-3mu/} n$ in the right fig., $a : c = b : d = e : f.$ $x$ value can be found using this relationship.

①     $5 : x = 2.5 : 2.4,$    thus    $2.5x = 12,$    $x = 4.8$ ②     $4 : x = 8 : 6.6,$    thus    $8x = 26.4,$    $x = 3.3$ ③     $x : (3+4) = 3.6 : 4,$    $4x = 25.2,$    $x = 6$

[Answer]

①   $x = 4.8 \left( = \dfrac{24}{5} \right)$    ②   $x = 3.3$    ③   $x = 6.$ Student Code

Fig.7

STUDY SUPPORT SYSTEM

BACKGROUND OF THE INVENTION

1. Field of the Invention

The present invention relates to a study support system, more specifically, a computer based learning and instruction system which can improve a students study efficiency level and instructor operations in various education organizations, e.g. cram schools, preparatory schools or the like.

2. Description of the Related Art

Here is a proposal for various study support systems targeting elementary as well as junior high school students.

In one such proposed system, an examination paper tailored for the ability of the target student can be automatically computer printed. However, it is first necessary to input many types of information, such as layout of the test paper, problem attributes (lesson unit, the target structure and the object to be learned) and test attributes (the title and level of difficulty.)

In another proposed system, the layout of the answer sheet provides bar codes used for specifying problems and for inputting information concerning correct and incorrect answers. Therefore, in this system, a students weak points can be recognized and analyzed by observing incorrectly answered problems detected by the bar code reader. Additionally, this system automatically prints out supplementary lesson and examination papers so that a student can receive additionally repeated practice related to the field of study that he is having trouble with.

This system's usefulness can be appreciated due to the fact that individual guidance can be given proportionately in accordance with test performance.

However, students weak points generally correspond to lack of understanding key points such as basic formulas, definitions and principles. Consequently, by repeatedly doing the same problems that have already proven to be a problem for a student, the student cannot be expected to advance quickly. Basically, the students study efficiency level will continue to be low.

It can be said that a more effective method for advancing a students knowledge and conquering the so-called weak points would be to study the subject again rather than repeatedly testing a student on the weak point over and over.

On the other hand, when considering any study support system, it is extremely important that operations are easy and that processing is fast all for the sake of efficiency. In addition, it is also important for such a system to able to recognize problems revolving around the so-called weak points and to display statistics regarding this information promptly.

SUMMARY OF THE INVENTION

The inventor, taking into consideration all of the above stated and spending countless hours researching study methods was able to make this invention.

The purpose of this invention is to provide a study support system which can improve student study efficiency and instruction by the teacher.

According to one aspect of this invention, a study support system comprises a text and a computer. The text comprises two parts. The first part in which an item for study is printed, and the second, a portion in which a problem relating to the study item is printed but an answer thereto is not. Each problem has its own corresponding code and in the second division, a bar code corresponding thereto is printed. The computer comprises several means. First, a bar code reader means for reading each bar code from the text. Next, storage means where information relating to each study item such as the answer to the problem, an explanation of the problem, and at least one exercise similar to the problem are stored. Next, means for processing and retrieving the information stored in the storage means corresponding to the bar code read by the bar code reader. Finally, means for outputting the retrieved information data as visual information displayed on a screen and/or printed on paper and/or as aural information via a speaker. When the bar code is read by the bar code reader, the data is then input to the processing means. This processing specifies the problem code corresponding to the problem being worked on. Then the information such as the answer and explanation are retrieved from the storage means.

DESCRIPTION OF THE PREFERRED EMBODIMENTS

Embodiments of the present invention will now be described in detail in conjunction with the drawings.

In the drawings, the study support system according to the present invention comprises a text for study (2) and a computer (3).

In this embodiment, the text (2) is a textbook having bound pages, in which a number of various study items (6) are printed. However, it is also possible for this text to be broken down into separate sheets.

Figure 2:
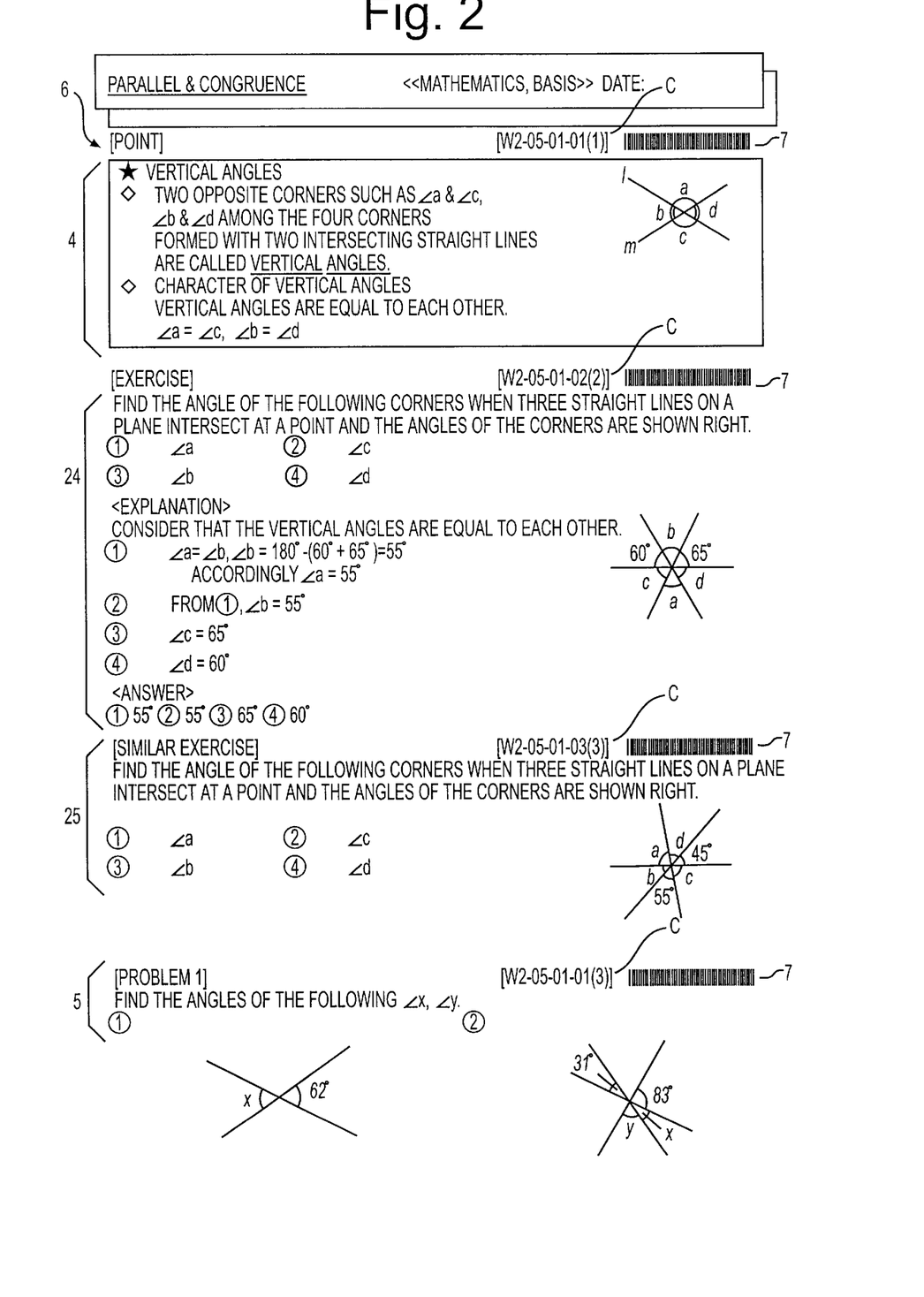
FIG. 2 shows an example of the contents of the text for study.

FIG. 2 shows an example of the text (2) which is a mathematics text for junior high school students. The page illustrated here is titled "Parallel and Congruence."

The study items (6) include at least the point of study (4) where basic matters such as formulas and definitions are explained and a problem or question (5) without the solution or answer.

The study items (6) in this example also include a basic exercise (24) and other similar exercises (25).

The exercise (24) gives an explanation of the point of study (4), using concrete numerical values and also the answer.

The exercise (25) is similar to the problem (5). However, no explanation is displayed. For instance, when this system is applied to, foreign languages, words are changed and sentence structures can be changed in the similar exercises. For science and sociology, numerical values and figures can be changed. Words, idioms and sentences can be changed as desired when studying ones native language.

However, the exercise (24) and similar exercises (25) are not also necessary in regard to the present invention.

Each study item (6) has its code, and a bar code (7) corresponding to this code is printed near the study item (6).

The bar code (7) corresponding to the problem (5) should always be printed. However, the bar codes corresponding to the point of study (4), exercise (24) and similar exercises (25) are optional.

Figure 1:
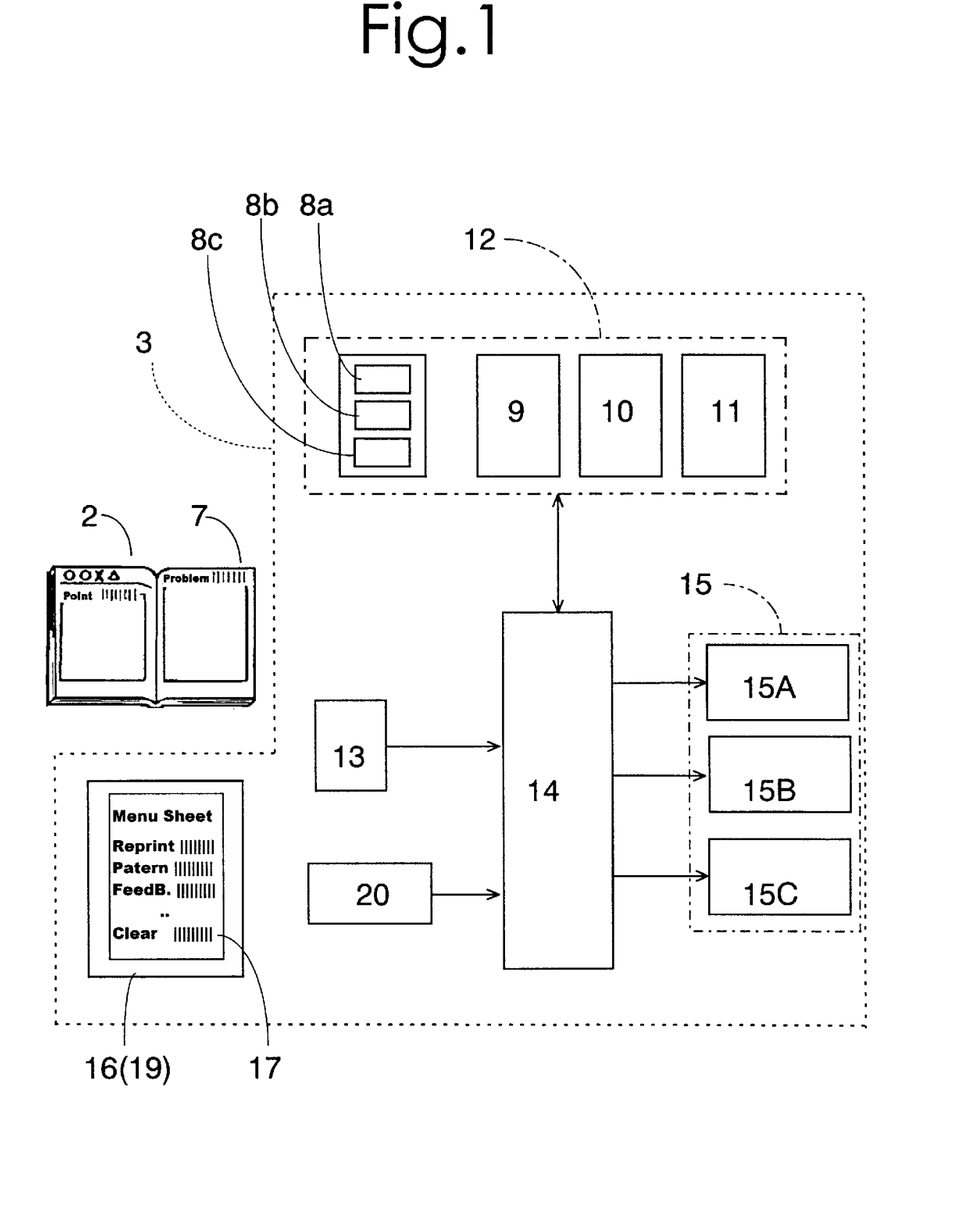
FIG. 1 is a conceptual view showing an embodiment of the present invention.
Figure 7:
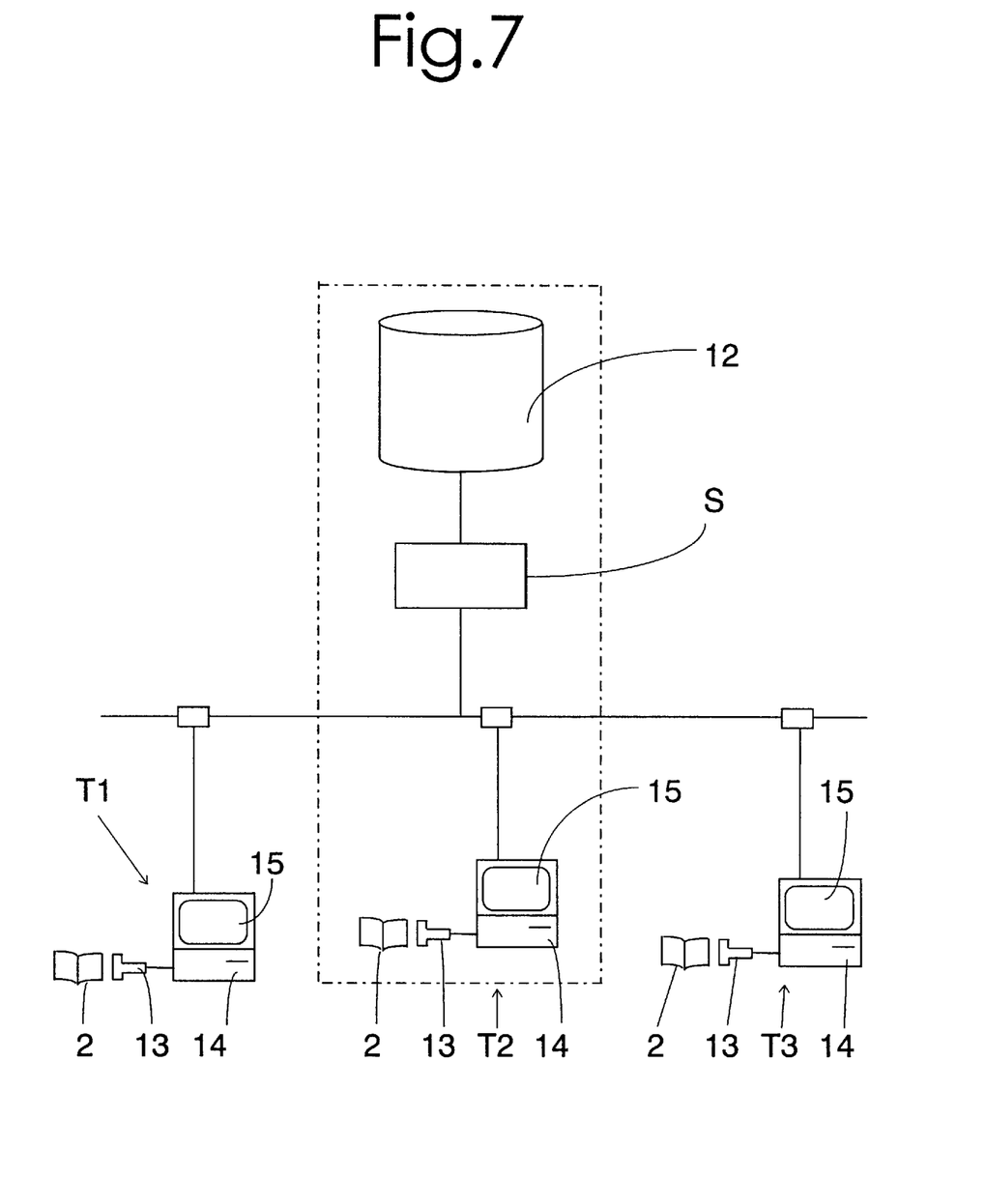
FIG. 7 is a conceptual view showing another embodiment of the present invention.

The above mentioned computer system (3) comprises a central processing unit (14), storage unit (12), output system (15) and an input system (16). The input system (16) is for giving various instructions to the processing unit (14). In FIG. 1, an off-line computer system is utilized. In FIG. 7, an on-line computer system is used. For the on-line system, the storage means (12) is a so-called client server system which various terminals T1, T2 and T3 share. As seen in this example, the storage means (12) is connected by a network cable to the server device (S), which consists of the file server, print server and image server. The server device is subsequently connected to each terminal. In this manner, all of the data can be shared with each terminal respectively.

For the storage means (12), magnetic disks, commonly referred to as hard disks or magneto-optic disks are preferred.

In the storage means (12), the following data is stored together along with individual codes (C), problem data (8a) which corresponds to the problems (5) printed on the text (2), study point data (8b) which corresponds to points (4) printed in the text (2), answer data (10) for the problems (5), explanation data (9) used for explaining the solutions to the problems (such as relative formulas and definitions), and similar exercise data (11) to the problems (5).

The problem data (8a) and study point data (8b) are not always necessary because they are printed in the text (2). Every piece of data can be read from the storage unit (12) by specifying the code (C) as a retrieval key.

Each piece of data is composed of at least one kind of data including: text data, image data (such as still frame pictures, animation, movie clips, etc.), and sound data (such as synthetic voice, sounds, music, etc.). It is preferable to couple the animation or movie data with voice data. For example, for such data, a computer animated video reflection in which the process the teachers uses to solve the problem is actually recorded and displayed. Other similar techniques may also be used.

In the storage means (12), data (8c) dealing with the order in which the problems will be studied is stored. Here, the "order of studying is the time series order of study. For instance, for junior high school students studying mathematics in Japan, they first study "Parallel and Congruence" and then "Triangle and Square", "Similar Figure", and then "Arrangement of Material", etc. in this very order. The "order of study" function is intended for this purpose.

In other words, in the storage means (12), the data for the problem, study point, answer, explanation and similar exercise with different orders are stored.

For the previously mentioned processing means (14), a central processing unit can be used. For this, the so-called personal computer can be utilized.

The systems operations (not shown in the illustrations) are also stored in the above mentioned storage means (12) beforehand and the processing means (14) carries out a sequence of operations corresponding to the stored programs.

The previously mentioned output means (15) in this example is comprised of: a display monitor (15A) including a CRT, a liquid crystal screen or the like where information can be displayed; a printer (15A) which prints information on paper; and a speaker system (15C) which generates aural information, including for example a sound board or a voice board. However, it is not always necessary for the output means (15) to utilize all of the above mentioned features.

The input means (16) is comprised of a bar code reader (13), bar codes (17) for operation and the above mentioned bar codes (7) for the study items (6).

Figure 3:
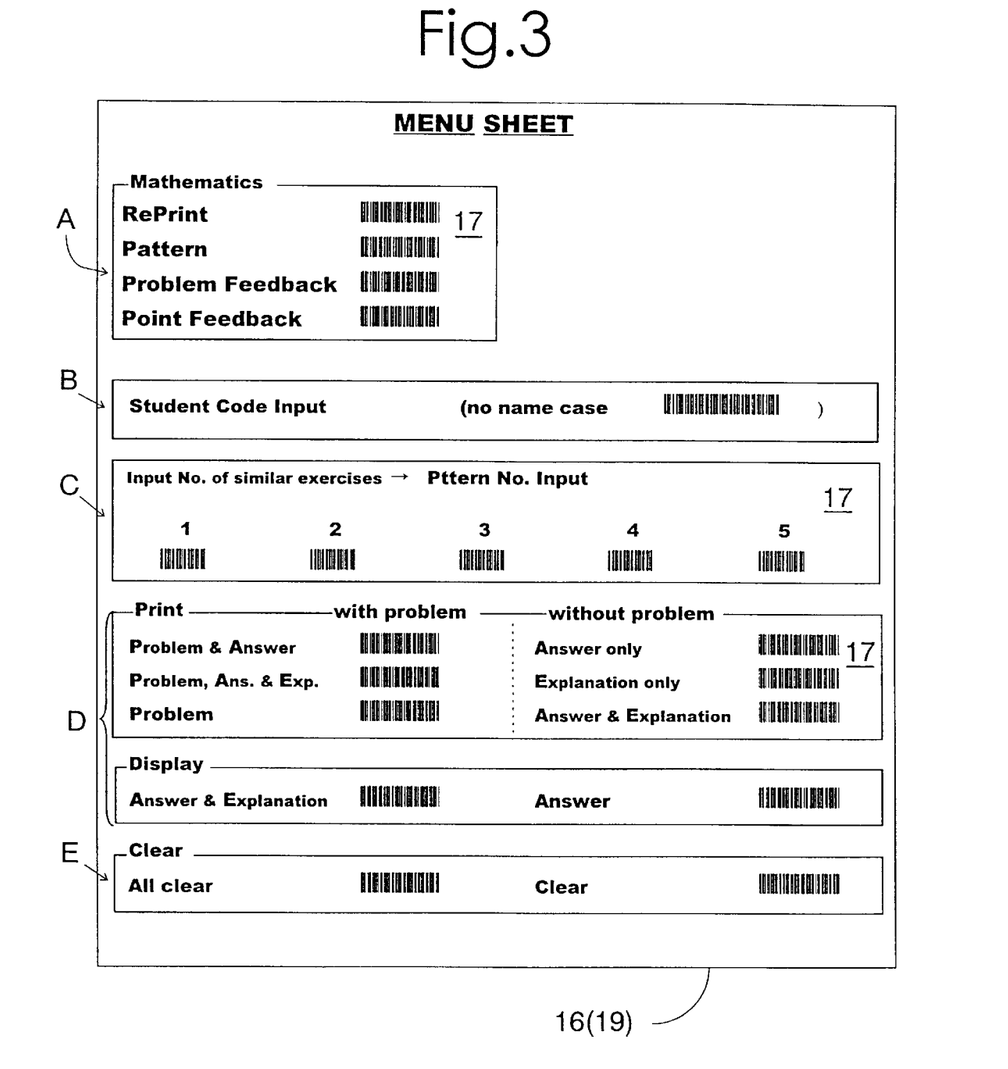
FIG. 3 is a plan view showing an example of the input means.

The bar codes (17) correspond to various encoded instructions for the processing means (14). The bar codes (17) are printed on a menu sheet (19) as shown in FIGS. 1 and 3. When bar codes (17) are read with the bar code scanner (13), the corresponding instructions are sent to the processing means (14).

Using this menu sheet (19) and the bar code scanner (13), the following processing selections can be made: (A) Study procedure; (B) Student code input; (C) Pattern number input; (D) Output selection: and (E) All Clear and Clear.

(A): Study Procedure: The study procedure includes the following instructions:

(A-a): Re-print (Same Problem) This instruction is to print or display the problem (5) specified by the bar code scanner (13) again. This process is useful for providing repeated practice for students with problem areas.

(A-b): Pattern training (Similar Exercises) This command is to print or display exercises similar to the problem (5) specified by the bar code scanner (13) wherein numerical value, figures, words, etc. are slightly changed. By doing so, the student has a chance practice more problems and thus his understanding of the study point can improve.

(A-c): Problem feedback (Review problems) This command is for processing the information that is returned from the problem (5) or the study point (4) specified by the bar code reader (13). This process relates directly to problems (5) of an previous order of study from a previous unit. Even if the study point (4) is specified, the feedback corresponds to the problems.

(A-d): Point Feedback (Review point) This command is for processing information returned from the problems (5) or study point (4) specified by the bar code reader (13) to a study point of a previous order of study. Even if the problem (5) is specified, the feedback corresponds to the study point.

Thus the students weak points are reconfirmed. Detection of this weak point is the most effective way of overcoming it. Therefore, improvement is made from this review.

As for the feedback, the order of study for each problem (5) or study point (4) is stored in the storage means as explained above. When the bar code of the problem (5) or the study point (4) is read by the bar code scanner (13), the processing means (14) sets the course of study according to the stored study sequence. This course of study is basically a students historical study chart representing the order of study now being executed. Then, this "problem or point feedback" instruction is selected and the course of study returns to a previous study order by a predetermined step. If a command to output study items such as point, problem, exercise, etc. is given, items of the previous study order are retrieved by using the code obtained based on the study order and output.

Figure 4:
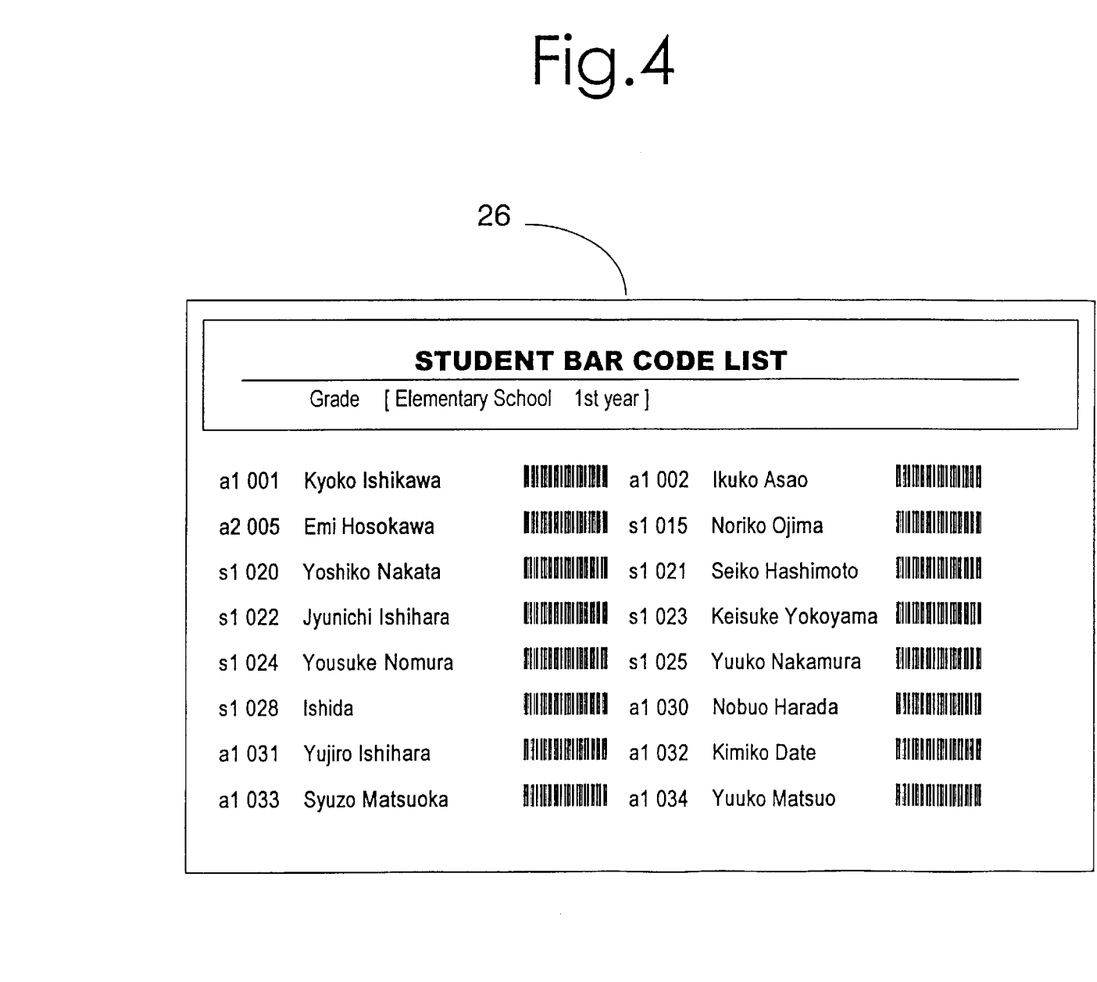
FIG. 4 is a view showing an example of the student bar code list.
Figure 5:
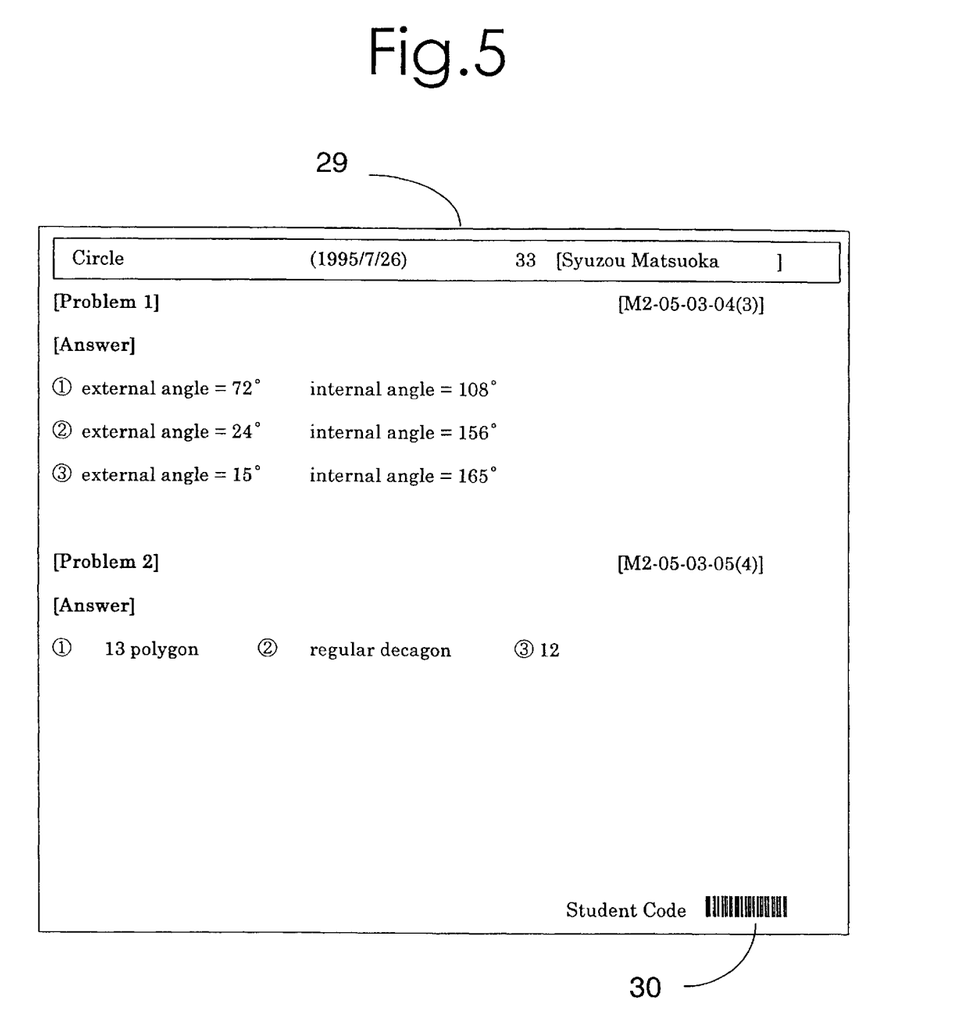
FIGS. 5 and 6 are examples of a printout.

(B): Student code input As shown in FIG. 4, a student bar code list (26) is made beforehand by printing the students' names and their bar codes (30) in pairs for example side by side. These are stored in the storage means (12). By reading the bar code listed next to the desired student's name with the bar code scanner (13), it is possible to specify tasks for a particular student. Additionally, the student's name and code can be printed on the printout as shown in FIG. 5. If the printout is a study problem for instance, it becomes easy to register grades in the computer because the student's bar code (30) is printed as well.

(C): Pattern number input When the pattern training (A-b) is selected in the study procedure (A), the number of similar exercises to be output can be input by selecting the desired problems bar codes. Thus the teacher can select appropriate problems according to the students ability and past performance.

(D): Output selection The output selection includes the following instructions.

(D-a): Print The problem, answer and explanation can be printed by selecting a combination thereof. For example, "only problem", "problem and answer", "problem and explanation", "problem answer and explanation" may be selected simply by scanning the desired functions bar code with the bar code scanner. In this manner, if a student answered a problem incorrectly, the teacher is able to give him a printed copy of the problem with the correct solution and an explanation of the solution together. The student may then compare his work to the correct solution. For the student, this is very useful because he can pinpoint exactly where he made mistakes.

(D-b) Display This is to display "only explanation", "only answer", or "answer and explanation" on the display 15c.

The information displayed on the screen may also be heard through the speaker system (15C). Here, it is important to change the color of the audible portion on the screen so that the user may quickly focus on that part.

In addition to printing and displaying data as previously mentioned, it is also possible for data to be heard (not shown in the diagrams). In this case as well, what outputs will be heard are selected by the bar code reader. For example, "only explanation", "only answer", or "answer and explanation".

For language study, it is preferable to output pronunciation by voice. Therefore, the output selection can include more selections, such as "Display with sound" and "Display without sound". Even if the subject is mathematics, science, society, etc., it is possible to hear an explanation regarding the exercise, by sound. It is also possible to output the information by sound only. Of course, it is possible to combine these outputs.

(E): All Clear and Clear These instructions cause the input data or instructions to be canceled all or in parts.

FIG. 5 shows an example of the printout (29) output by specifying a variety of problems with the bar code reader (13) and selecting the "re-print", "student code input", and "Print (answer only)" from the menu sheet (19). On the printout (29), the answers are printed together with the student name along with a bar code (30) that represents a particular student.

Figure 6:
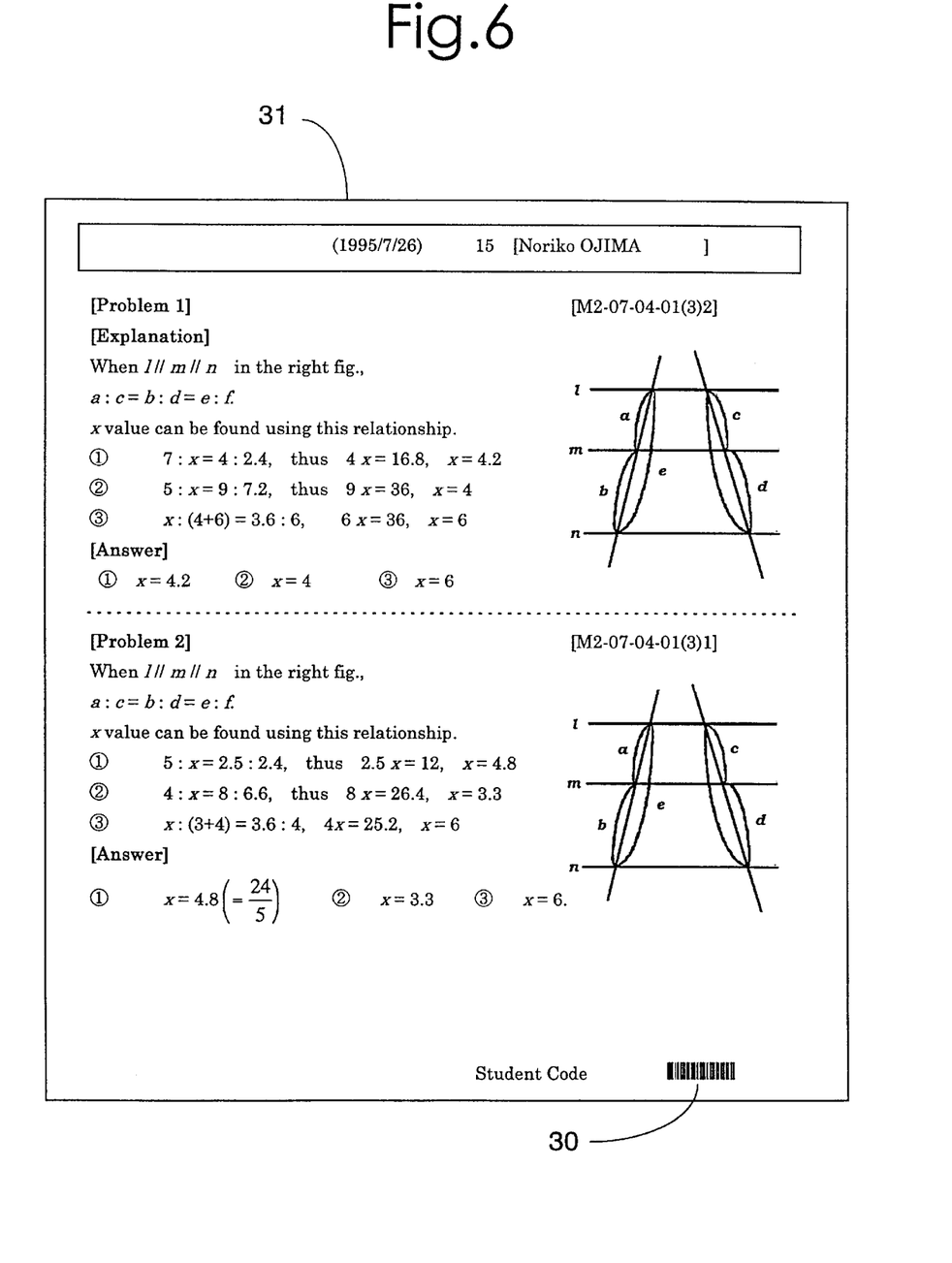

FIG. 6 shows an example of a printout (31) made possible by specifying a variety of problems and selecting the "re-print", "student code input", and "print (answer and explanation)" from the menu sheet (19). In this case, it is easy for the student to understand how to obtain the correct answer because the explanation is also printed along with the answer. This method is very useful for improving understanding.

In the above explained study support system, the teacher reads the bar codes (7) corresponding to the problems (5) which are considered weak points for the student from the text (2) with the bar code reader (13). As a result, the explanation and answer to the problem are pulled from the output means (15) at once, as shown in the display for example (15A). Additionally, the teacher can print the explanations and answers with the printer (15B) and hand it to the student. Then, the teacher can lecture on it making sure the student comprehends it. Further, it is possible for the student to go back and spend more time doing self study, improving efficiency.

As a result, guiding basic matters according to the weak points of each individual student becomes possible. Additionally, the teacher can greatly reduce the guidance time spent on each individual student, therefore improving guidance efficiency.

Teachers are able to evaluate a students ability through observation of results on various tasks performed by this invention. From these evaluations, the teacher can choose from "pattern training", "problem feedback", or "point feedback" selections accordingly, depending on the students needs. This system can deal with the students individually according to the level of the students learning, allowing the teacher to make the most efficient use of his time for evaluation and special instruction.

Further, with this system according to the invention, the student can study the text (2) by oneself.

Also, checking for the correct answer is possible by using the bar code reader (13) to read the bar code (7) of the problem (5), then selecting bar codes labeled "answer" from the "print" or "display" of the menu sheet. These tasks can be performed by the teacher or student.

All the operations necessary for the teacher during instruction can easily be performed by using the bar codes (7) from the text (2) and the bar codes (17) from the menu sheet. Therefore, annoying busy work becomes obsolete and the operativeness of the system improves. However, with this particular invention, it is possible to give instruction using a keyboard and mouse (20), instead of the menu sheet (19) or together with menu Sheet.

For instance, the data read by the bar code can be used as data for processing results. Additionally, the study support system methods utilized by this invention may be applied to various subjects of study, such as science, society, national languages and foreign languages, etc.

As mentioned above, it is not always necessary to store the problem data (8a) and study point data (8b) in the storage means (12). However, in order to decrease instructors' preparation work so as to be able to devote their time to the instruction and also to improve the flexibility of the system, preferably the problem data (8a) and study point data (8b) are stored in the storage means (12), and all the problem data (8a) are compiled and printed into a book for easy reference. In this date book, the stored problems are systematically printed together with individual bar codes (C). By reading bar codes (C) in the data book with the bar code reader (13), the processing means (14) retrieve the corresponding data from the storage means (12) and compile the retrieved data into a text for study (2), and the text (2) is automatically computer printed via the printer (15B). Therefore, various custom texts (2) can be easily made. Further, various ready-made texts (2) are stored beforehand in the storage means (12) as test paper data in the form of various combinations of a plurality of problem data (8a). All the ready-made texts (2) are printed out together with individual bar code and bound into a work book beforehand for easy reference. By reading the bar codes printed in the ready-made texts with the bar code reader (13), the processing means (14) retrieve the concerning problem data from the storage means (12) and compile the retrieved data, and the same text is automatically computer printed via the printer (15B). Therefore, the ready-made texts (2) can be easily duplicated.

In the above-mentioned example, the bar codes (17) for operation are printed on the separate menu sheet (19).

However, it is also possible to print all or some of the bar codes (17) for operation on the text for study (2). The bar codes (17), for example those for "Display" and "Clear", are usually printed on the same page as the problems. But, it is also possible to print the codes on the back page of the same sheet. Further, in case the texts are bound into a textbook, the bar codes (17) can be printed on another bound sheet.

I claim:

1. A study support system comprising a text and computer means, said text comprising a first division in which an item for study is printed and a second division in which a problem relating to said study item is printed, but an answer thereto is not, said problem having its own code, said second division provided with a bar code representing the code of the said problem, said computer means comprising a bar code reader for reading said bar code, storage means in which information relating to said study item including the answer to said problem, an explanation of said problem, and at least one similar exercise to said problem are stored, processing means for retrieving the information stored in said storage means according to the bar code read by the bar code reader, output means for outputting the retrieved information data as sight information displayed on a screen and/or printed on paper and/or as aural information.

2. The study system according to claim 1, which further comprises output selecting means for selecting at least one piece of information from the explanation and at least one similar exercise and allowing said output means to output the selected information.

3. The study support system according to claim 2, wherein said output selecting means comprise said bar code reader and a menu sheet, said menu sheet having bar codes representing procedures of study and printed therein and readable by the bar code reader.

4. The study support system according to claim 2, wherein said output selecting means include a keyboard and a mouse.

5. The study support system according to claim 3, wherein said output selecting means include a keyboard and a mouse.

6. The study support system according to claim 1, which further comprises study feedback means for changing the item of study to a study item of a previous order to the order of the study item corresponding to the bar code read by the bar code reader, said order stored in said storage means, and output selecting means for selecting at least one piece of information from at least the point of the study item of said previous order and a problem relating thereto, and allowing said output means to output the selected information.

7. The study support system according to claim 1, which further comprises a data book into which a number of problems are compiled and printed together with individual bar codes, and said storage means memorize data relating to all said a number of problems, an answer to each problem, an explanation of each problem, and at least one similar exercise to each problem, and said processing means, by reading the bar codes in the data book with the bar code reader, retrieve the corresponding data from the storage means and compile the retrieved data into a text for study, and allow said output means to print the text for study, whereby various texts can be made.

8. The study support system according to claim 1, which further comprises a work book formed by binding various prepared texts, each text having its own bar code printed thereon, and said storage means memorize data relating to each text and the bar code, and said processing means, by reading the bar code printed in the text with the bar code reader, retrieve the corresponding data from the storage means, and allow said output means to print the text for study, whereby the text can be duplicated.

* * * * *